(12) United States Patent
Horikawa

(10) Patent No.: US 8,257,870 B2
(45) Date of Patent: Sep. 4, 2012

(54) NON-AQUEOUS ELECTROLYTE FOR BATTERY AND NON-AQUEOUS ELECTROLYTE BATTERY COMPRISING THE SAME

(75) Inventor: Yasuo Horikawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1452 days.

(21) Appl. No.: 11/826,242

(22) Filed: Jul. 13, 2007

(65) Prior Publication Data

US 2008/0020285 A1 Jan. 24, 2008

(30) Foreign Application Priority Data

Jul. 24, 2006 (JP) ................................ 2006-200788
Jun. 19, 2007 (JP) ................................ 2007-161610

(51) Int. Cl.
*H01M 6/16* (2006.01)

(52) U.S. Cl. ........ 429/328; 429/345; 429/339; 429/199; 429/200; 429/326; 429/327

(58) Field of Classification Search .................. 429/328, 429/345, 339, 199, 200, 326, 327
See application file for complete search history.

(56) References Cited

FOREIGN PATENT DOCUMENTS

| JP | 4-184870 A | 7/1992 |
|---|---|---|
| JP | 6-13108 A | 1/1994 |
| JP | 8-22839 A | 1/1996 |
| JP | 10-189040 A | 7/1998 |
| JP | 11-67267 A | 3/1999 |
| JP | 2000-182669 A | 6/2000 |
| JP | 2003-109659 A | 4/2003 |
| JP | 2006-107910 A | 4/2006 |

*Primary Examiner* — Laura Weiner

(74) *Attorney, Agent, or Firm* — Sughrue Mion, PLLC

(57) ABSTRACT

A non-aqueous electrolyte for a battery comprises a non-aqueous solvent containing a specified cyclic phosphazene compound and a specified difluorophosphate compound, a specified aniline derivative and a support salt.

5 Claims, No Drawings

NON-AQUEOUS ELECTROLYTE FOR BATTERY AND NON-AQUEOUS ELECTROLYTE BATTERY COMPRISING THE SAME

BACKGROUND OF THE INVENTION

1. Field of the Invention

This invention relates to a non-aqueous electrolyte for a battery and a non-aqueous electrolyte battery comprising the same, and more particularly to a non-aqueous electrolyte for a battery having a non-combustibility and a non-aqueous electrolyte battery having excellent battery performances and a high safety.

2. Description of the Related Art

The non-aqueous electrolyte is used as an electrolyte for a lithium battery, a lithium ion secondary battery, an electric double layer capacitor or the like. These devices have a high voltage and a high energy density, so that they are widely used as a driving power source for personal computers, mobile phones and the like. As the non-aqueous electrolyte are commonly used ones obtained by dissolving a support salt such as $LiPF_6$ or the like in an aprotic organic solvent such as an ester compound, an ether compound or the like. However, since the aprotic organic solvent is combustible, when it leaks from the device, there is a possibility of firing-burning and also there is a problem in view of the safety.

As to this problem is examined a method for rendering the non-aqueous electrolyte into a flame retardance. For example, there are proposed a method wherein a phosphate such as trimethyl phosphate or the like is used in the non-aqueous electrolyte, and a method wherein the phosphate is added to the aprotic organic solvent (see JP-A-H4-184870, JP-A-H8-22839 and JP-A-2000-182669). However, these phosphates are gradually reduction-decomposed on a negative electrode by repetition of discharge and recharge, so that there is a problem that battery performances such as discharge-recharge efficiency, cyclability and the like are largely deteriorated. Also, when the battery using the phosphate is stored at a charged state, the decomposition reaction of the phosphate progresses due to a high voltage of the battery even if the battery is not discharged and recharged, so that there is a problem that the battery performances after the storing are largely deteriorated.

As to the latter problem, there are attempted a method wherein a compound for suppressing the decomposition of the phosphate is further added to the non-aqueous electrolyte, a method wherein the molecular structure of the phosphate itself is devised, and so on (see JP-A-H11-67267, JP-A-H10-189040 and JP-A-2003-109659). Even in these methods, however, there is a limit in the addition amount and also the flame retardance of the phosphate itself is deteriorated and the like, so that the electrolyte gets only into the self-extinguishing property and the safety of the electrolyte cannot be sufficiently ensured.

Also, JP-A-H06-13108 discloses a method wherein a phosphazene compound is added to the non-aqueous electrolyte for giving the flame retardance to the non-aqueous electrolyte. Some of the phosphazene compounds exhibit a high non-combustibility and have a tendency to improve the flame retardance of the non-aqueous electrolyte as the amount added to the non-aqueous electrolyte is increased. However, since the phosphazene compound exhibiting the high non-combustibility is generally low in the solubility of a support salt and the dielectric constant, as the addition amount is increased, the precipitation of the support salt and the lowering of electric conductivity are caused, and hence the discharge capacity of the battery may be lowered or the discharge-recharge performance may be deteriorated. Therefore, when the phosphazene compound exhibiting the high non-combustibility is added, there is a problem that the addition amount is limited.

Furthermore, JP-A-2006-107910 proposes a non-aqueous electrolyte comprising a combination of a fluorinated phosphate and a phosphazene compound as a technique for simultaneously establishing the high non-combustibility and battery performances. The non-aqueous electrolyte is high in the flame retardance and excellent in the battery performances, but when it is exposed to a severe condition such as high temperature or the like at a charged state or when discharge-recharge are repeated at a low voltage, the capacity tends to gradually decrease just the same.

Recently, the devices such as lithium battery, lithium ion secondary battery, electric double layer capacitor and the like are also actively developed as a power source in vehicles including HEV. For such an application, it is required that the safety is high and stable performances can be ensured within a wider temperature range or wider voltage range, but the conventional techniques can not be said to have a satisfactory level in these points.

SUMMARY OF THE INVENTION

It is, therefore, an object of the invention to solve the above-mentioned problems of the conventional techniques and to provide a non-aqueous electrolyte for a battery having a non-combustibility and a non-aqueous electrolyte battery comprising the non-aqueous electrolyte for the battery and having excellent battery performances and a high safety even under a high-temperature environment.

The inventor has made various studies in order to achieve the above object and discovered that the high flame retardance can be given to the non-aqueous electrolyte by constructing a non-aqueous electrolyte with a combination of a non-aqueous solvent comprising a specified cyclic phosphazene compound and a specified difluorophosphate compound with a specified aniline derivative and also a non-aqueous electrolyte battery using such an electrolyte can maintain the excellent battery performances even under a high-temperature environment, and as a result the invention has been accomplished.

That is, the non-aqueous electrolyte for the battery according to the invention comprises a non-aqueous solvent containing a cyclic phosphazene compound represented by the following general formula (I):

$$(NPR^1{}_2)_n \quad (I)$$

[wherein $R^1$s are independently a halogen element, an alkoxy group or an aryloxy group; and n is 3-4] and a difluorophosphate compound represented by the following general formula (II):

[wherein $R^2$ is an alkyl group, a cycloalkyl group, an alkenyl group, an alkoxy-substituted alkyl group or an aryl group], an aniline derivative represented by the following general formula (III):

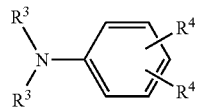

[wherein $R^3$s are independently an alkyl group or an aryl group; $R^4$s are independently hydrogen, methyl group, methoxy group or phenyl group] and a support salt.

In the non-aqueous electrolyte for the battery according to the invention, as the aniline derivative is preferable a compound of the general formula (III) wherein $R^3$ is methyl group.

In the non-aqueous electrolyte for the battery according to the invention, as the cyclic phosphazene compound is preferable a compound of the general formula (I) wherein at least three of $R^1$s are fluorine.

In a preferable embodiment of the non-aqueous electrolyte for the battery according to the invention, a volume ratio of the cyclic phosphazene compound of the general formula (I) to the difluorophosphate compound of the general formula (II) is within a range of 10/90-80/20.

In another preferable embodiment of the non-aqueous electrolyte for the battery according to the invention, a content of the aniline derivative of the general formula (III) is 0.01-0.4% by mass based on the whole of the non-aqueous electrolyte for the battery.

In the other preferable embodiment of the non-aqueous electrolyte for the battery according to the invention, the non-aqueous solvent further contains an aprotic organic solvent.

In the non-aqueous electrolyte according to the invention, a total content of the cyclic phosphazene compound of the general formula (I) and the difluorophosphate compound of the general formula (II) in the non-aqueous solvent is preferable to be not less than 30% by volume.

Also, the non-aqueous electrolyte battery according to the invention comprises the above-described non-aqueous electrolyte for the battery, a positive electrode and a negative electrode.

According to the invention, there can be provided a non-aqueous electrolyte having a high flame retardance by using a non-aqueous solvent containing the specified cyclic phosphazene compound and the specified difluorophosphate compound and a higher flame retardance by using a combination with the specified aniline derivative and capable of sufficiently maintaining battery performances even under a high-temperature environment when being applied to a non-aqueous electrolyte battery. Also, there can be provided a non-aqueous electrolyte battery comprising the non-aqueous electrolyte and having a high safety and excellent battery performances.

In the non-aqueous electrolyte for the battery according to the invention, it is considered that a highly non-combustible gas component generated by the reaction and thermal decomposition of the cyclic phosphazene compound and the difluorophosphate compound develops a high flame retardance. Although the reason is not necessarily clear, it is also considered that a film formed on a surface of an electrode by a synergistic effect of three compounds of the cyclic phosphazene compound, the difluorophosphate compound and the aniline derivative can effectively suppress the decomposition of the electrolyte to accomplish stable discharge-recharge performances, and further the film works even at a high temperature without being decomposed, so that the electrolyte is not decomposed even under the high-temperature environment, and as a result it can maintain the same capacity as at room temperature.

DESCRIPTION OF THE PREFERRED EMBODIMENTS

<Non-Aqueous Electrolyte for Battery>

The non-aqueous electrolyte for the battery according to the invention will be described in detail below. The non-aqueous electrolyte for the battery according to the invention comprises the non-aqueous solvent containing the cyclic phosphazene compound represented by the general formula (I) and the difluorophosphate compound represented by the general formula (II), and the aniline derivative represented by the general formula (III) and the support salt. Furthermore, the non-aqueous solvent may contain an aprotic organic solvent.

The cyclic phosphazene compound contained in the non-aqueous electrolyte for the battery according to the invention is represented by the general formula (I). In the formula (I), $R^1$s are independently a halogen element, an alkoxy group or an aryloxy group, and n is 3-4.

As the halogen element in $R^1$ of the formula (I) are mentioned fluorine, chlorine, bromine and the like. As the alkoxy group in $R^1$ are mentioned methoxy group, ethoxy group, propoxy group, butoxy group, an allyloxy group containing a double bond, an alkoxy-substituted alkoxy group such as methoxy ethoxy group, methoxy ethoxy ethoxy group or the like, and so on. Also, as the aryloxy group in $R^1$ are mentioned phenoxy group, methylphenoxy group, xylenoxy group (i.e. xylyloxy group), methoxy phenoxy group and the like. A hydrogen element in the alkoxy group and the aryloxy group may be substituted with a halogen element and is preferable to be substituted with fluorine. Moreover, $R^1$ in the formula (I) may be bonded with another $R^1$. In this case, two $R^1$s are bonded with each other to form an alkylenedioxy group, an arylenedioxy group or an oxyalkylene-aryleneoxy group, and as such a bivalent group are mentioned ethylenedioxy group, propylenedioxy group, phenylenedioxy group and the like.

$R^1$s in the general formula (I) may be same or different. Also, $R^1$ in the formula (I) is preferable to be a halogen element from a viewpoint that safety is improved and more preferable to be fluorine from a viewpoint of a low viscosity. Moreover, it is preferable that three or more of $R^1$s are fluorine in view of balancing the safety and the low viscosity.

Furthermore, n in the formula (I) is 3-4. The phosphazene compounds may be used alone or in a combination of two or more.

The difluorophosphate compound contained in the non-aqueous electrolyte for the battery according to the invention is represented by the general formula (II). In the formula (II), $R^2$ is an alkyl group, a cycloalkyl group, an alkenyl group, an alkoxy-substituted alkyl group or an aryl group. As the alkyl group in $R^2$ of the formula (II) are mentioned methyl group, ethyl group, propyl group, butyl group, pentyl group, hexyl group and the like. As the cycloalkyl group are mentioned cyclopropyl group, cyclohexyl group and the like. As the alkenyl group are mentioned allyl group, methally group and the like. As the alkoxy-substituted alkyl group are mentioned methoxy ethyl group, methoxy ethoxy ethyl group and the like. As the aryl group are mentioned phenyl group, methyl phenyl group, methoxy phenyl group and the like. A hydrogen element in the above substituents may be substituted with a halogen element and is preferable to be substituted with fluorine. Among them, methyl group, ethyl group, propyl group, trifluoroethyl group, phenyl group and 3-fluorophenyl group are preferable from a viewpoint of an excellent flame retardance and a low viscosity.

As the difluorophosphate compound of the formula (II) are concretely mentioned methyl difluorophosphate, ethyl difluorophosphate, trifluoroethyl difluorophosphate, propyl difluorophosphate, trifluoropropyl difluorophosphate, allyl difluorophosphate, butyl difluorophosphate, pentyl difluorophosphate, hexyl difluorophosphate, cyclohexyl difluorophosphate, methoxy ethyl difluorophosphate, methoxy ethoxy ethyl difluorophosphate, phenyl difluorophosphate, fluorophenyl difluorophosphate and the like. These difluorophosphates may be used alone or in a combination of two or more.

In the non-aqueous electrolyte according to the invention, the volume ratio of the cyclic phosphazene compound to the difluorophosphate compound is preferably within a range of 5/95-95/5, more preferably within a range of 10/90-80/20 from a viewpoint of balancing the battery performances. Also, the total content of the cyclic phosphazene compound and the difluorophosphate compound in the non-aqueous solvent is preferably not less than 30% by volume from a viewpoint of sufficiently ensuring the safety of the non-aqueous electrolyte battery at a warmed state.

The aniline derivative contained in the non-aqueous electrolyte for the battery according to the invention is represented by the general formula (III). In the formula (III), $R^3$s are independently an alkyl group or an aryl group. As the alkyl group are mentioned methyl group, ethyl group, propyl group and the like, and as the aryl group are mentioned phenyl group and the like. Among them, methyl group is preferable. Moreover, $R^4$s are independently hydrogen, methyl group, methoxy group or phenyl group.

As the aniline derivative of the formula (III) are concretely mentioned N,N-dimethylaniline, N,3-dimethylaniline, 2-methyl-N,N-dimethylaniline, 3-methyl-N,N-dimethylaniline, 4-methyl-N,N-dimethylaniline, 2-methoxy-N-methylaniline, 3-methoxy-N-methylaniline, 4-methoxy-N-methylaniline, 2-methoxy-N,N-dimethylaniline, 3-methoxy-N,N-dimethylaniline, 4-methoxy-N,N-dimethylaniline, N,N,3,5-tetramethylaniline, 3,5-dimethoxy-N,N-dimethylaniline, 2,4-dimethoxy-N,N-dimethylaniline, N-methyl diphenylamine, triphenylamine and the like. Among them, 3-methyl-N,N-dimethylaniline, N,N,3,5-tetramethylaniline, 3-methoxy-N,N-dimethylaniline and N-methyl diphenylamine are preferable. These aniline derivatives may be used alone or in a combination of two or more.

The content of the aniline derivative is preferably within a range of 0.01-0.4% by mass, more preferably within a range of 0.02-0.1% by mass based on the whole of the non-aqueous electrolyte for the battery from a viewpoint of balancing the battery performances.

As the support salt used in the non-aqueous electrolyte for the battery of the invention is preferable a support salt serving as an ion source for a lithium ion. The support salt is not particularly limited, but preferably includes lithium salts such as $LiClO_4$, $LiBF_4$, $LiBC_4O_8$, $LiPF_6$, $LiCF_3SO_3$, $LiAsF_6$, $LiC_4F_9SO_3$, $Li(CF_3SO_2)_2N$, $Li(C_2F_5SO_2)_2N$ and so on. These support salts may be used alone or in a combination of two or more.

The concentration of the support salt in the non-aqueous electrolyte is preferably 0.2-1.5 mol/L (M), more preferably 0.5-1.2 mol/L (M). When the concentration of the support salt is less than 0.2 mol/L, the electric conductivity of the electrolyte cannot be sufficiently ensured and troubles may be caused in the discharge property and the charge property of the battery, while when it exceeds 1.5 mol/L, the viscosity of the electrolyte rises and the sufficient mobility of the lithium ion cannot be ensured, and hence the sufficient electric conductivity of the electrolyte cannot be ensured and troubles may be caused in the discharge property and the charge property of the battery likewise the above-mentioned case.

Also, to the non-aqueous solvent may be added various aprotic organic solvents commonly used in the non-aqueous electrolyte for the battery within a scope of not damaging the object of the invention. The amount of the aprotic organic solvent added is preferable to be not more than 70% by volume in the non-aqueous solvent in order to ensure the high safety in the battery. As the aprotic organic solvent are concretely mentioned carbonates such as dimethyl carbonate (DMC), diethyl carbonate (DEC), diphenyl carbonate, ethyl methyl carbonate (EMC), ethylene carbonate (EC), propylene carbonate (PC), vinylene carbonate (VC) and the like; ethers such as 1,2-dimethoxy ethane (DME), tetrahydrofuran (THF), diethyl ether (DEE) and the like; γ-butyrolactone (GBL), γ-valerolactone, carboxylate esters such as methyl formate (MF) and the like; nitriles such as acetonitrile and the like; amides such as dimethylformamide and the like; sulfones such as dimethyl sulfoxide and the like; and sulfides such as ethylene sulfide and the like. These aprotic organic solvents may be used alone or in a combination of two or more.

In the formation of the non-aqueous electrolyte battery, the non-aqueous electrolyte according to the invention can be used as it is, but may be used through a method of impregnating into, for example, a suitable polymer, a porous support or a gelatinous material for keeping.

<Non-Aqueous Electrolyte Battery>

Then, the non-aqueous electrolyte battery according to the invention will be described in detail. The non-aqueous electrolyte battery of the invention comprises the above-mentioned non-aqueous electrolyte for the battery, a positive electrode and a negative electrode, and may be provided with other members usually used in the technical field of the non-aqueous electrolyte battery such as a separator and the like, if necessary. In this case, the non-aqueous electrolyte battery of the invention may be constructed as a primary battery or a secondary battery.

As an active material for the positive electrode of the non-aqueous electrolyte battery according to the invention are preferably mentioned metal oxides such as $V_2O_5$, $V_6O_{13}$, $MnO_2$, $MnO_3$ and the like; lithium-containing composite oxides such as $LiCoO_2$, $LiNiO_2$, $LiMn_2O_4$, $LiFeO_2$, $LiFePO_4$ and the like; metal sulfides such as $TiS_2$, $MoS_2$ and the like; and electrically conductive polymers such as polyaniline and the like. The lithium-containing composite oxide may be a composite oxide including two or three transition metals selected from the group consisting of Fe, Mn, Co, Al and Ni. In this case, the composite oxide is represented by $LiMn_xCo_yNi_{(1-x-y)}O_2$ [wherein $0 \leq x<1$, $0 \leq y<1$, $0<x+y \leq 1$], $LiMn_xNi_{(1-x)}O_2$ [wherein $0 \leq x<1$], $LiMn_xCo_{(1-x)}O_2$ [wherein $0 \leq x<1$], $LiCo_xNi_{(1-x)}O_2$ [wherein $0 \leq x<1$], $LiCo_xNi_yAl_{(1-x-y)}O_2$ [wherein $0 \leq x<1$, $0 \leq y<1$, $0<x+y \leq 1$], $LiFe_xCo_yNi_{(1-x-y)}O_2$ [wherein $0 \leq x<1$, $0 \leq y<1$, $0<x+y \leq 1$], $LiMn_xFe_yO_{2-x-y}$ or the like. These active materials for the positive electrode may be used alone or in a combination of two or more.

As an active material for the negative electrode of the non-aqueous electrolyte battery according to the invention are preferably mentioned lithium metal itself, an alloy of lithium with Al, In, Sn, Si, Pb, Zn or the like, a metal oxide such as $TiO_2$ doped with lithium ion or the like, a metal oxide composite such as $TiO_2$—$P_2O_4$ or the like, and a carbonaceous material such as graphite or the like. Among them, the carbonaceous material is preferable. Particularly in the battery using the carbonaceous material, the non-aqueous electrolyte according to the invention can significantly develop an improvement effect under the high-temperature environment which is one of purposes of the invention. These active materials for the negative electrode may be used alone or in a combination of two or more.

The positive electrode and the negative electrode may be mixed with an electrically conducting agent and a binding agent, if necessary. As the electrically conducting agent are mentioned acetylene black and the like, and as the binding agent are mentioned polyvinylidene fluoride (PVDF), polytetrafluoroethylene (PTFE), styrene-butadiene rubber (SBR), carboxymethyl cellulose (CMC) and the like. These additives may be compounded in the same compounding ratio as in the conventional case.

As the other member used in the non-aqueous electrolyte battery of the invention is mentioned a separator interposed between the positive and negative electrodes in the non-aqueous electrolyte battery so as to prevent short-circuiting of current due to the contact between the electrodes. As a material of the separator are preferably mentioned materials capable of surely preventing the contact between the electrodes and passing or impregnating the electrolyte such as non-woven fabrics, thin-layer films and the like made of a synthetic resin such as polytetrafluoroethylene, polypropylene, polyethylene, cellulose based resin, polybutylene terephthalate, polyethylene terephthalate or the like. They may be a single substance, a mixture or a copolymer. Among them, a microporous film having a thickness of about 20-50 μm and made of polypropylene or polyethylene, and a film made of cellulose based resin, polybutylene terephthalate, polyethylene terephthalate or the like are particularly preferable. In the invention, various well-known members usually used in the battery can be preferably used in addition to the above separator.

The form of the above non-aqueous electrolyte battery according to the invention is not particularly limited, but there are preferably mentioned various well-known forms such as coin type, button type, paper type, cylindrical type of polygonal form or spiral structure and so on. In case of the button type, the non-aqueous electrolyte battery can be made by preparing sheet-shaped positive and negative electrodes and sandwiching the separator between the positive and negative electrodes. Also, in case of the spiral structure, the non-aqueous electrolyte battery can be made by preparing a sheet-shaped positive electrode, sandwiching between collectors, piling a sheet-shaped negative electrode thereon and then winding them or the like.

EXAMPLES

The following examples are given in illustration of the invention and are not intended as limitations thereof.

Example 1

A non-aqueous electrolyte is prepared by dissolving $LiPF_6$ at a concentration of 1 mol/L in a mixed solvent of 50% by volume of trifluoroethyl difluorophosphate and 50% by volume of a cyclic phosphazene compound of the formula (I) wherein n is 4, two of all $R^1$s are ethoxy group and six thereof are fluorine and adding 0.1% by mass of 3-methyl-N,N-dimethylaniline thereto. Then, the flame retardance of the thus obtained non-aqueous electrolyte is evaluated by the following method to obtain a result shown in Table 1.

(1) Evaluation of Flame Retardance

A burning length and a burning time of a flame ignited under an atmospheric environment are measured and evaluated according to a method arranging UL94HB method of UL (Underwriting Laboratory) standard. Concretely, a test piece is prepared by impregnating a $SiO_2$ sheet of 127 mm×12.7 mm with 1.0 mL of the electrolyte based on UL test standard and evaluated. Evaluation standards of non-combustibility, flame retardance, self-extinguishing property and combustion property are shown below.

<Evaluation of non-combustibility> In a case that a test flame does not ignite a test piece (combustion length: 0 mm), it is evaluated that there is non-combustibility.

<Evaluation of flame retardance> In a case that the ignited flame does not arrive at a line of 25 mm and the ignition is not observed in the falling object, it is evaluated that there is flame retardance.

<Evaluation of self-extinguishing property> In a case that the ignited flame extinguishes at a line of 25-100 mm and the ignition is not observed in a falling object, it is evaluated that there is self-extinguishing property.

<Evaluation of combustion property> In a case that the ignited flame exceeds a line of 100 mm, it is evaluated that there is combustion property.

(2) Production of Battery $LiCo_{0.2}Ni_{0.8}O_2$ is used as an active material for a positive electrode, and this oxide, acetylene black as an electrically conducting agent and polyvinylidene fluoride as a binding agent are mixed at a mass ratio of 94:3:3 and dispersed into N-methylpyrrolidone to prepare a slurry, and the slurry is applied on an aluminum foil as a collector for a positive electrode, then dried and pressed to obtain a positive electrode sheet having a thickness of 70 μm. This is cut off in the form of a rectangle (4 cm×50 cm) and welded with a collecting tab of an aluminum foil to prepare a positive electrode. Also, an artificial graphite is used as an active material for a negative electrode, and the artificial graphite and polyvinylidene fluoride as a binding agent are mixed at a mass ratio of 90:10 and dispersed into an organic solvent (mixed solvent of 50/50% by mass of ethyl acetate and ethanol) to prepare a slurry, and the slurry is applied on a copper foil as a collector for a negative electrode, then dried and pressed to obtain a negative electrode sheet having a thickness of 50 μm. This is cut off in the form of a rectangle (4 cm×50 cm) and welded with a collecting tab of a nickel foil to prepare a negative electrode. Then, a separator (micro-porous film: made of polypropylene) is cut off in the form of a rectangle (4 cm×50 cm), sandwiched between the positive and negative electrodes, planospirally wound around a base spacer of 4 cm×3 cm, inserted into an armoring material of a heat-sealed aluminum-laminated film (polyethylene terephthalate/aluminum/polypropylene), charged with the electrolyte, then evacuated and immediately heat-sealed to make a flat and laminate-type battery.

(3) Evaluation of High-Temperature Storage Performance

With respect to the thus obtained laminate-type battery, two cycles of discharge-recharge are repeated in an atmosphere of 20° C. under conditions of upper limit voltage: 4.2 V, lower limit voltage: 2.5 V and current density: 0.25 mA/cm$^2$, and the discharge capacity measured at this time is divided by a known weight of the positive electrode to determine the initial discharge capacity (mAh/g). It is further charged up to 4.2 V and then stored in an atmosphere of 65° C. for 30 days. Then, it is placed in an atmosphere of 20° C., charged and discharged once more under the same discharge-recharge conditions to determine a discharge capacity (i.e., discharge capacity after high-temperature storage), and the capacity recovery ratio is calculated according to the following equation:

Capacity recovery ratio=discharge capacity after high-temperature storage/initial discharge capacity× 100(%)

and is used as an indication for a deterioration due to the high-temperature storage.

(4) Evaluation of Low-Voltage Cycle Performance

With respect to the laminate-type battery wherein two cycles of the discharge-recharge have been repeated in the atmosphere of 20° C. under the conditions of upper limit voltage: 4.2 V, lower limit voltage: 2.5 V and current density: 0.25 mA/cm$^2$ in the same manner as in the (3), the discharge-recharge are repeated up to 50 cycles in an atmosphere of 20° C. under conditions of upper limit voltage: 4.2 V, lower limit voltage: 2.0 V and current density: 0.25 mA/cm$^2$ to determine the discharge capacity after 50 cycles, and the capacity remaining ratio is calculated according to the following equation:

Capacity remaining ratio S=discharge capacity after 50 cycles/initial discharge capacity×100(%)

and is used as an indication for the cyclic performance of the battery under the low-voltage condition.

(5) Safety Test Through Nail Penetration

The same laminate-type battery as described above is made and the safety test through the nail penetration is conducted. In the nail penetration test, two cycles of the discharge-recharge are repeated in an atmosphere of 20° C. within a voltage range of 4.2-2.5 V at a current density of 0.25 mA/cm$^2$, further charged up to 4.2 V and placed on a battery holder (made of stainless) with a temperature adjustment function, a lateral center thereof is perpendicularly penetrated with a nail made of stainless steel having a diameter of 3 mm at the shaft portion at a speed of 0.5 cm/s and it is observed whether or not the battery ignites in bursting. Results are shown in Table 1.

Example 2

A non-aqueous electrolyte is prepared by dissolving LiPF$_6$ at a concentration of 1.2 mol/L in a mixed solvent of 40% by volume of ethyl difluorophosphate, 10% by volume of a cyclic phosphazene compound of the formula (I) wherein n is 3, one of all R$^1$s is methoxy ethoxy ethoxy group and five thereof are fluorine and 50% by volume of a cyclic phosphazene compound of the formula (I) wherein n is 3, one of all R$^1$s is propoxy group and five thereof are fluorine and adding 0.1% by mass of N,N,3,5-tetramethylaniline thereto, and the flame retardance of the thus obtained non-aqueous electrolyte is evaluated. Also, a non-aqueous electrolyte secondary battery is made in the same manner as in Example 1, and the evaluations of the high-temperature storage performance and low-voltage cycle performance and the safety test are respectively conducted. Results are shown in Table 1.

Example 3

A non-aqueous electrolyte is prepared by dissolving LiPF$_6$ at a concentration of 1 mol/L in a mixed solvent of 35% by volume of cyclohexyl difluorophosphate, 15% by volume of a cyclic phosphazene compound of the formula (I) wherein n is 3, three of all R$^1$s are methoxy group and three thereof are fluorine, 10% by volume of ethylene carbonate and 40% by volume of ethyl methyl carbonate and adding 0.06% by mass of 3-methoxy-N,N-dimethylaniline thereto, and the flame retardance of the thus obtained non-aqueous electrolyte is evaluated. Also, a non-aqueous electrolyte secondary battery is made in the same manner as in Example 1, and the evaluations of the high-temperature storage performance and low-voltage cycle performance and the safety test are respectively conducted. Results are shown in Table 1.

Example 4

A non-aqueous electrolyte is prepared by dissolving Li(C$_2$F$_5$SO$_2$)$_2$N at a concentration of 1 mol/L in a mixed solvent of 15% by volume of phenyl difluorophosphate, 35% by volume of a cyclic phosphazene compound of the formula (I) wherein n is 3 and all R$^1$s are fluorine, 10% by volume of propylene carbonate and 40% by volume of dimethyl carbonate and adding 0.04% by mass of N-methyl diphenylamine thereto, and the flame retardance of the thus obtained non-aqueous electrolyte is evaluated. Also, a non-aqueous electrolyte secondary battery is made in the same manner as in Example 1, and the evaluations of the high-temperature storage performance and low-voltage cycle performance and the safety test are respectively conducted. Results are shown in Table 1.

Example 5

A non-aqueous electrolyte is prepared by dissolving LiPF$_6$ at a concentration of 1 mol/L in a mixed solvent of 27% by volume of trifluoropropyl difluorophosphate, 3% by volume of a cyclic phosphazene compound of the formula (I) wherein n is 3, two of all R$^1$s are allyloxy group and four thereof are fluorine, 23% by volume of ethylene carbonate and 47% by volume of diethyl carbonate and adding 0.02% by mass of 3-methoxy-N,N-dimethylaniline thereto, and the flame retardance of the thus obtained non-aqueous electrolyte is evaluated. Then, a non-aqueous electrolyte secondary battery is made in the same manner as in Example 1 except that LiMn$_{0.9}$Co$_{0.1}$O$_2$ is used instead of the positive electrode of LiCo$_{0.2}$Ni$_{0.8}$O$_2$ used in Example 1, and the evaluations of the high-temperature storage performance and low-voltage cycle performance and the safety test are respectively conducted. Results are shown in Table 1.

Example 6

A non-aqueous electrolyte is prepared by dissolving LiPF$_6$ at a concentration of 1 mol/L in a mixed solvent of 6% by volume of methyl difluorophosphate, 24% by volume of a cyclic phosphazene compound of the formula (I) wherein n is 3, one of all R$^1$s is phenoxy group and five thereof are fluorine, 5% by volume of vinylene carbonate and 65% by volume of dimethyl carbonate and adding 0.01% by mass of N,N,3,5-tetramethylaniline and 0.01% by mass of N-methyl diphenylamine thereto, and the flame retardance of the thus obtained non-aqueous electrolyte is evaluated. Also, a non-aqueous electrolyte secondary battery is made in the same manner as in Example 1, and the evaluations of the high-temperature storage performance and low-voltage cycle performance and the safety test are respectively conducted. Results are shown in Table 1.

Example 7

A non-aqueous electrolyte is prepared by dissolving LiPF$_6$ at a concentration of 1 mol/L in a mixed solvent of 50% by volume of trifluoroethyl difluorophosphate and 50% by volume of a cyclic phosphazene compound of the formula (I)

wherein n is 4, two of all R¹s are ethoxy group and six thereof are fluorine and adding 0.4% by mass of 3-methyl-N,N-dimethylaniline thereto, and the flame retardance of the thus obtained non-aqueous electrolyte is evaluated. Also, a non-aqueous electrolyte secondary battery is made in the same manner as in Example 1, and the evaluations of the high-temperature storage performance and low-voltage cycle performance and the safety test are respectively conducted. Results are shown in Table 1.

Comparative Example 1

A non-aqueous electrolyte is prepared by dissolving $LiPF_6$ at a concentration of 1 mol/L in a mixed solvent of 50% by volume of triethyl phosphate and 50% by volume of a cyclic phosphazene compound of the formula (I) wherein n is 4, two of all R¹s are ethoxy group and six thereof are fluorine and adding 0.1% by mass of 3-methyl-N,N-dimethylaniline thereto, and the flame retardance of the thus obtained non-aqueous electrolyte is evaluated. Also, a non-aqueous electrolyte secondary battery is made in the same manner as in Example 1, and the evaluations of the high-temperature storage performance and low-voltage cycle performance and the safety test are respectively conducted. Results are shown in Table 1.

Comparative Example 2

A non-aqueous electrolyte is prepared by dissolving $LiPF_6$ at a concentration of 1 mol/L in a mixed solvent of 27% by volume of trimethyl phosphate, 3% by volume of a cyclic phosphazene compound of the formula (I) wherein n is 3, two of all R¹s are allyloxy group and four thereof are fluorine, 23% by volume of ethylene carbonate and 47% by volume of diethyl carbonate and adding 0.02% by mass of 3-methoxy-N,N-dimethylaniline thereto, and the flame retardance of the thus obtained non-aqueous electrolyte is evaluated. Then, a non-aqueous electrolyte secondary battery is made in the same manner as in Example 1 except that $LiMn_{0.9}Co_{0.1}O_2$ is used instead of the positive electrode of $LiCo_{0.2}Ni_{0.8}O_2$ used in Example 1, and the evaluations of the high-temperature storage performance and low-voltage cycle performance and the safety test are respectively conducted. Results are shown in Table 1.

Comparative Example 3

A non-aqueous electrolyte is prepared by dissolving $LiPF_6$ at a concentration of 1 mol/L in a mixed solvent of 50% by volume of trifluoroethyl difluorophosphate and 50% by volume of a cyclic phosphazene compound of the formula (I) wherein n is 4, two of all R¹s are ethoxy group and six thereof are fluorine, and the flame retardance of the thus obtained non-aqueous electrolyte is evaluated. Also, a non-aqueous electrolyte secondary battery is made in the same manner as in Example 1, and the evaluations of the high-temperature storage performance and low-voltage cycle performance and the safety test are respectively conducted. Results are shown in Table 1.

Comparative Example 4

A non-aqueous electrolyte is prepared by dissolving $Li(C_2F_5SO_2)_2N$ at a concentration of 1 mol/L in a mixed solvent of 15% by volume of phenyl difluorophosphate, 35% by volume of a cyclic phosphazene compound of the formula (I) wherein n is 3 and all R¹s are fluorine, 10% by volume of propylene carbonate and 40% by volume of dimethyl carbonate, and the flame retardance of the thus obtained non-aqueous electrolyte is evaluated. Also, a non-aqueous electrolyte secondary battery is made in the same manner as in Example 1, and the evaluations of the high-temperature storage performance and low-voltage cycle performance and the safety test are respectively conducted. Results are shown in Table 1.

Comparative Example 5

A non-aqueous electrolyte is prepared by dissolving $LiPF_6$ at a concentration of 1 mol/L in a mixed solvent of 17% by volume of a cyclic phosphazene compound of the formula (I) wherein n is 3, three of all R¹s are methoxy group and three thereof are fluorine, 17% by volume of ethylene carbonate and 66% by volume of ethyl methyl carbonate and adding 0.06% by mass of 3-methoxy-N,N-dimethylaniline thereto, and the flame retardance of the thus obtained non-aqueous electrolyte is evaluated. Also, a non-aqueous electrolyte secondary battery is made in the same manner as in Example 1, and the evaluations of the high-temperature storage performance and low-voltage cycle performance and the safety test are respectively conducted. Results are shown in Table 1.

Comparative Example 6

A non-aqueous electrolyte is prepared by dissolving $LiPF_6$ at a concentration of 1 mol/L in a mixed solvent of 50% by volume of cyclohexyl difluorophosphate, 10% by volume of ethylene carbonate and 40% by volume of ethyl methyl carbonate and adding 0.06% by mass of 3-methoxy-N,N-dimethylaniline thereto, and the flame retardance of the thus obtained non-aqueous electrolyte is evaluated. Also, a non-aqueous electrolyte secondary battery is made in the same manner as in Example 1, and the evaluations of the high-temperature storage performance and low-voltage cycle performance and the safety test are respectively conducted. Results are shown in Table 1.

Example 8

A non-aqueous electrolyte is prepared by dissolving $LiPF_6$ at a concentration of 1 mol/L in a mixed solvent of 50% by volume of trifluoroethyl difluorophosphate and 50% by volume of a cyclic phosphazene compound of the formula (I) wherein n is 4, two of all R¹s are ethoxy group and six thereof are fluorine and adding 0.1% by mass of triphenylamine thereto, and the flame retardance of the thus obtained non-aqueous electrolyte is evaluated. Also, a non-aqueous electrolyte secondary battery is made in the same manner as in Example 1, and the evaluations of the high-temperature storage performance and low-voltage cycle performance and the safety test are respectively conducted. Results are shown in Table 1.

Example 9

A non-aqueous electrolyte is prepared by dissolving $LiPF_6$ at a concentration of 1 mol/L in a mixed solvent of 6% by volume of methyl difluorophosphate, 24% by volume of a cyclic phosphazene compound of the formula (I) wherein n is 3, four of all R¹s are phenoxy group and two thereof are fluorine, 5% by volume of vinylene carbonate and 65% by volume of dimethyl carbonate and adding 0.01% by mass of N,N,3,5-tetramethylaniline and 0.01% by mass of N-methyl diphenylamine thereto, and the flame retardance of the thus obtained non-aqueous electrolyte is evaluated. Also, a non-aqueous electrolyte secondary battery is made in the same manner as in Example 1, and the evaluations of the high-temperature storage performance and low-voltage cycle performance and the safety test are respectively conducted. Results are shown in Table 1.

Comparative Example 7

A non-aqueous electrolyte is prepared by dissolving $LiPF_6$ at a concentration of 1 mol/L in a mixed solvent of 50% by volume of trifluoroethyl difluorophosphate and 50% by volume of a cyclic phosphazene compound of the formula (I) wherein n is 4, two of all $R^1$s are ethoxy group and six thereof are fluorine and adding 0.1% by mass of N-methyl-p-anisidine thereto, and the flame retardance of the thus obtained non-aqueous electrolyte is evaluated. Also, a non-aqueous electrolyte secondary battery is made in the same manner as in Example 1, and the evaluations of the high-temperature storage performance and low-voltage cycle performance and the safety test are respectively conducted. Results are shown in Table 1.

Example 10

A non-aqueous electrolyte is prepared by dissolving $LiPF_6$ at a concentration of 1 mol/L in a mixed solvent of 18% by volume of trifluoropropyl difluorophosphate, 2% by volume of a cyclic phosphazene compound of the formula (I) wherein n is 3, two of all $R^1$s are allyloxy group and four thereof are fluorine, 27% by volume of ethylene carbonate and 53% by volume of diethyl carbonate and adding 0.02% by mass of 3-methoxy-N,N-dimethylaniline thereto, and the flame retardance of the thus obtained non-aqueous electrolyte is evaluated. Then, a non-aqueous electrolyte secondary battery is made in the same manner as in Example 1 except that $LiMn_{0.9}Co_{0.1}O_2$ is used instead of the positive electrode of $LiCo_{0.2}Ni_{0.8}O_2$ used in Example 1, and the evaluations of the high-temperature storage performance and low-voltage cycle performance and the safety test are respectively conducted. Results are shown in Table 1.

Example 11

A non-aqueous electrolyte is prepared by dissolving $LiPF_6$ at a concentration of 1 mol/L in a mixed solvent of 50% by volume of trifluoroethyl difluorophosphate and 50% by volume of a cyclic phosphazene compound of the formula (I) wherein n is 4, two of all $R^1$s are ethoxy group and six thereof are fluorine and adding 0.6% by mass of 3-methyl-N,N-dimethylaniline thereto, and the flame retardance of the thus obtained non-aqueous electrolyte is evaluated. Also, a non-aqueous electrolyte secondary battery is made in the same manner as in Example 1, and the evaluations of the high-temperature storage performance and low-voltage cycle performance and the safety test are respectively conducted. Results are shown in Table 1.

TABLE 1

|  | Evaluation of flame retardance | Initial discharge capacity (mAh/g) | Capacity recovery ratio after high-temperature storage (%) | Capacity remaining ratio after 50 cycles (%) | Safety evaluation for battery Nail penetration test at 40° C. |
|---|---|---|---|---|---|
| Example 1 | Non-combustibility | 141 | 91 | 92 | No ignition |
| Example 2 | Non-combustibility | 138 | 93 | 91 | No ignition |
| Example 3 | Non-combustibility | 138 | 93 | 93 | No ignition |
| Example 4 | Non-combustibility | 137 | 92 | 92 | No ignition |
| Example 5 | Non-combustibility | 137 | 91 | 93 | No ignition |
| Example 6 | Non-combustibility | 140 | 93 | 93 | No ignition |
| Example 7 | Non-combustibility | 135 | 86 | 89 | No ignition |
| Comparative Example 1 | Non-combustibility | 56 | 55 | 28 | No ignition |
| Comparative Example 2 | Flame retardance | 96 | 58 | 14 | Ignition |
| Comparative Example 3 | Non-combustibility | 136 | 75 | 73 | No ignition |
| Comparative Example 4 | Non-combustibility | 135 | 73 | 70 | No ignition |
| Comparative Example 5 | Flame retardance | 139 | 93 | 93 | Ignition |
| Comparative Example 6 | Non-combustibility | 108 | 68 | 60 | No ignition |
| Example 8 | Non-combustibility | 136 | 83 | 82 | No ignition |
| Example 9 | Non-combustibility | 128 | 90 | 88 | No ignition |
| Comparative Example 7 | Non-combustibility | 121 | 65 | 68 | No ignition |
| Example 10 | Non-combustibility | 136 | 91 | 93 | Ignition |
| Example 11 | Non-combustibility | 108 | 81 | 78 | No ignition |

As seen from Examples 1-7 in Table 1, the non-aqueous electrolyte containing the compounds of the formulae (I), (II) and (III) of not less than 30% by volume has a non-combustibility, and also the battery using the non-aqueous electrolyte maintains the excellent battery performances even after the high-temperature storage and under the low-voltage discharge-recharge conditions and has the high safety. Thus, it is confirmed that the non-aqueous electrolyte battery exhibiting the non-combustibility and being excellent in the high-temperature storage performance, the cycle performance under the low-voltage condition and the safety can be obtained by the non-aqueous electrolyte according to the invention.

On the other hand, as seen from Comparative Examples 1 and 2, the non-aqueous electrolyte containing the normal phosphate triester has a small initial capacity and cannot suppress a capacity decline due to the high-temperature storage and the repetition of the cycles even if the compound of the formula (I) and the aniline derivative of the formula (III) are added. Also, as seen from Comparative Examples 3 and 4, the cases that the aniline derivative of the formula (III) is not added are inferior to Examples 1 and 4 in the capacity after the high-temperature storage and the cycle performance.

As shown in Comparative Example 5, when the difluorophosphate of the formula (II) is not used, adding a large amount of the phosphazene compound of the formula (I) causes a separation into two layers, so that not less than 18% by volume of the phosphazene compound of the formula (I) cannot be added, and hence the safety of the battery cannot be ensured.

Furthermore, as seen from Comparative Example 6, the case that the phosphazene compound of the formula (I) is not added is inferior to Example 3 in the initial capacity, the capacity after the high-temperature storage and the cycle performance, even if the aniline derivative is used.

Also, as seen from Example 8, when the aniline derivative represented by the formula (III) wherein $R^3$ is not methyl group is used, an improvement effect in the high-temperature storage performance is small, so that as the aniline derivative is preferable a compound represented by the formula (III) wherein $R^3$s are methyl group.

Furthermore, as seen from Comparative Example 7, when the aniline derivative not represented by the formula (III) is used, an improvement effect in the high-temperature storage performance is not confirmed, so that it is necessary to use as the aniline derivative a compound having a molecular structure as shown by the formula (III).

As also shown in Example 9, when the phosphazene compound of the formula (I) wherein the number of fluorine in $R^1$ is small is used, it is observed that the capacity tends to decline as compared with Example 6. Therefore, it is seen that three or more of $R^1$s in the cyclic phosphazene compound of the formula (I) are preferable to be fluorine.

Furthermore, as shown in Example 10, when the total content of the compound represented by the formula (I) and the compound represented by the formula (II) is about 20% by volume, the ignition cannot be suppressed in the safety test through the nail penetration in the warmed state depending on the kind of the electrode material, although the non-combustibility is exhibited. Therefore, it is seen that the total content of the cyclic phosphazene compound of the formula (I) and the difluorophosphate compound of the formula (II) is preferably not less than 30% by volume.

Also, as shown in Example 11, when more than 0.4% by mass of the aniline derivative is used, a large capacity decline is observed as compared with Example 7. Therefore, it is seen that the content of the aniline derivative is preferably about 0.01-0.4% by mass.

As seen from the above results, there can be provided the non-aqueous electrolyte battery balancing the non-combustibility and the excellent battery performances by using the non-aqueous electrolyte characterized by containing the cyclic phosphazene compound represented by the general formula (I), the difluorophosphate compound represented by the general formula (II) and the aniline derivative represented by the general formula (III).

What is claimed is:

1. A non-aqueous electrolyte for a battery comprising:
   A) a non-aqueous solvent containing 1) a cyclic phosphazene compound represented by the following general formula (I):

$(NPR^1{}_2)_n$      (I)

[wherein $R^1$s are independently a halogen element, an alkoxy group or an aryloxy group; and n is 3-4] and 2) a difluorophosphate compound represented by the following general formula (II):

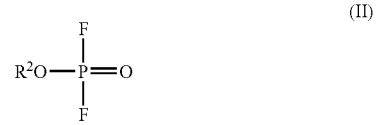

[wherein $R^2$ is an alkyl group, a cycloalkyl group, an alkenyl group, an alkoxy-substituted alkyl group or an aryl group];

B) an aniline derivative represented by the following general formula (III):

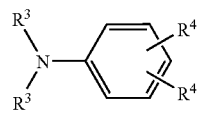

[wherein $R^3$s are independently an alkyl group or an aryl group; $R^4$s are independently hydrogen, methyl group, methoxy group or phenyl group] and C) a support salt, wherein a volume ratio of the cyclic phosphazene compound of the general formula (I) to the difluorophosphate compound of the general formula (II) is within a range of 10/90-80/20, a total content of the cyclic phosphazene compound of the general formula (I) and the difluorophosphate compound of the general formula (II) in the non-aqueous solvent is not less than 30% by volume based on the total volume of the non-aqueous solvent, and a content of the aniline derivative of the general formula (III) is 0.01-0.4% by mass based on the whole of the non-aqueous electrolyte for the battery.

2. A non-aqueous electrolyte for a battery according to claim 1, wherein $R^3$ in the general formula (III) is methyl group.

3. A non-aqueous electrolyte for a battery according to claim 1, wherein at least three of $R^1$s in the general formula (I) are fluorine.

4. A non-aqueous electrolyte for a battery according to claim 1, wherein the non-aqueous solvent further contains an aprotic organic solvent.

5. A non-aqueous electrolyte battery comprising a non-aqueous electrolyte for a battery as claimed in any one of claims 1, 2, 3, or 4, a positive electrode and a negative electrode.

* * * * *